July 30, 1963  R. JACOBSEN  3,099,430
ARRANGEMENT IN REGULATING VALVES FOR HEATING UNITS
Filed Jan. 31, 1961

INVENTOR
ROLF JACOBSEN

BY
AGENT 3,099,430
ARRANGEMENT IN REGULATING VALVES FOR
HEATING UNITS
Rolf Jacobsen, Vaekeroveien 169c, Oslo, Norway
Filed Jan. 31, 1961, Ser. No. 86,210
Claims priority, application Norway Feb. 3, 1960
5 Claims. (Cl. 251—146)

The present invention relates to an arrangement in regulating valves for heating units, especially but not exclusively, for plate radiators or the like having inner and outer walls and an intermediate space to receive a heating medium, and the object of the invention is to provide a valve by means of which the quantity of the through flowing heating medium and the pressure drop in the valve may be determined in a simple manner, at the same time as the limit resistance of each radiator may be effectively stipulated.

The invention is mainly distinguished by a cylindrical valve housing fixedly mounted in coaxial bores in the radiator walls, the inlet end of said housing being connected to a supply pipe for heat medium, a bore in the circumferential wall of said housing communicating with the said intermediate space a movable valve body controlling said bore which body is provided with a closing surface limited by a side surface forming oblique angle to the direction of movement of said valve body.

Figure 1:
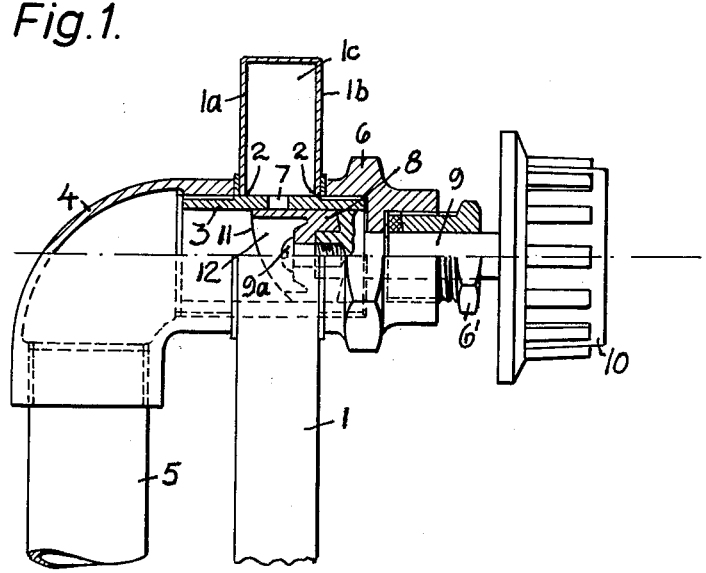
Figure 2:
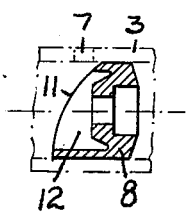

An embodiment of the invention is illustrated as an example, in the accompanying drawing in which:

FIGURE 1 shows the upper part of a radiator with the valve seen from the side, and the upper half thereof in axial section, and FIGURE 2 shows a side view of the valve body in axial section.

In the drawing 1 indicates the upper part of a heating unit such as a plate radiator, having inner and outer walls 1a and 1b, respectively, with an intermediate space 1c which is to be supplied with a heating medium.

Inserted in coaxial bores 2 in the walls 1a, 1b is a cylindrical sleeve-shaped valve housing 3, one externally threaded protruding end of which is connected to a supply pipe 5 for heating medium by an internally threaded elbow 4 which axially abuts against the wall 1a. On the opposite protruding end is threaded a cap nut 6 which abuts against the wall 1b so that the radiator 1 is clamped against the elbow 4. In order to seal the connection package rings, preferably made of fiber material, are inserted between the walls of the radiator and the bend and nut, respectively. As will be understood the valve housing may be secured in the bores 2 of the radiator by soldering, welding or in another suitable manner.

In the circumferential wall of the cylindrical valve housing 3 is provided a bore 7 communicating with the space 1c of the radiator 1. Said bore 7 has an area adapted to the desired pressure difference and the flow of heating medium. The bore 7 is controlled by a cylindrical valve body 8 rotatably supported in the housing 3. Said body 8 is secured, such as by a screw 9a, on the end of a spindle 9 which is supported rotatably in the cap nut 6 and a packing nut 6′ threaded into the outer end of said cap nut 6. On its outer end the spindle 9 carries an actuating button 10.

The valve body 8 extends so far into the housing 3 that its extremity projects well beyond the bore 7 so that said body in the position shown in FIG. 1 covers the bore 7 and shuts the supply of heating medium.

The inner end of the valve body 8 has an oblique end surface 11, preferably somewhat curved as shown in FIG. 2, so that the valve body 8 turned substantially one half of a revolution from the position shown in FIG. 1 uncovers the bore 7 and allows maximum supply of heating medium to the radiator.

As will be understood the valve body 8 during rotation thereof, covers or uncovers, respectively, the bore 7 gradually whereby the desired supply to the radiator may be regulated exactly.

The valve body 8 may be made of a somewhat elastic material, such as plastic, and be provided with an axial bore 12. By this construction the heating medium due to the pressure thereof exerts pressure on the inner wall of the bore 12 and expands the yieldably resilient body thereby increasing its sealing pressure against the inner circumference of the housing 3.

By altering the shape of the curvature of the end surface 11 and/or the shape or size of the bore 7 the quantity of heating medium supplied and the pressure drop in the valve may be regulated at will or according to the prevailing circumstances.

As will be understood the valve member 8, instead of being rotatable, may be arranged axially displaceable between closed and open position, the oblique end surface then being positioned in relation to this bore 7 so as to gradually cover or uncover, respectively, said bore in the manner above described.

I claim:
1. A regulating valve arrangement for a heating unit and the like comprising:
 (a) two opposite walls defining an intermediate space to receive a heating medium;
 (b) a sleeve shaped valve housing having a circumferential wall fixedly mounted in respective bores in said opposite walls, said bores having a common axis,
   (1) respective end portions of said housing protruding outwardly from said opposite walls in the direction of said axis and being formed with respective external threads,
   (2) said circumferential wall being formed with a bore communicating with said intermediate space;
 (c) supply pipe means for a heating medium,
   (1) said pipe means being formed with internal threads engaging the external threads of one of said end portions and axially abutting against one of said opposite walls;
 (d) a valve body movably mounted in said housing, said body having a closing face limited by a side surface obliquely inclined to the direction of movement of said body;
 (e) actuating means axially projecting from the other end portion of said housing for transmitting movement to said valve body;
 (f) a nut member threadedly engaging the external threads on said other end portion and axially abutting against the other one of said opposite walls; and
 (g) packing means on said nut member for movably sealing said actuating means to said housing.

2. Arrangement according to claim 1, wherein the side surface of the valve body is curved.

3. Arrangement according to claim 1 wherein said valve body is cylindrical and rotatably supported in said housing, said oblique side surface on said body being directed towards said one end portion of the housing.

4. An arrangement according to claim 3, wherein said valve body is of yieldably resilient material.

5. Arrangement according to claim 4 wherein said oblique end surface is curved.

References Cited in the file of this patent

UNITED STATES PATENTS

| | | |
|---|---|---|
| 1,091,238 | Perkins | Mar. 24, 1914 |
| 1,397,867 | Jones | Nov. 22, 1921 |
| 2,439,539 | Cellwork | Apr. 13, 1948 |

FOREIGN PATENTS

| | | |
|---|---|---|
| 831,809 | Great Britain | Mar. 30, 1960 |
| 1,155,441 | France | Nov. 25, 1957 |